May 10, 1932.  F. J. DOUGLASS ET AL  1,858,078
APPARATUS FOR CUTTING AND BEVELING PIPES
Filed Jan. 10, 1931  8 Sheets-Sheet 1
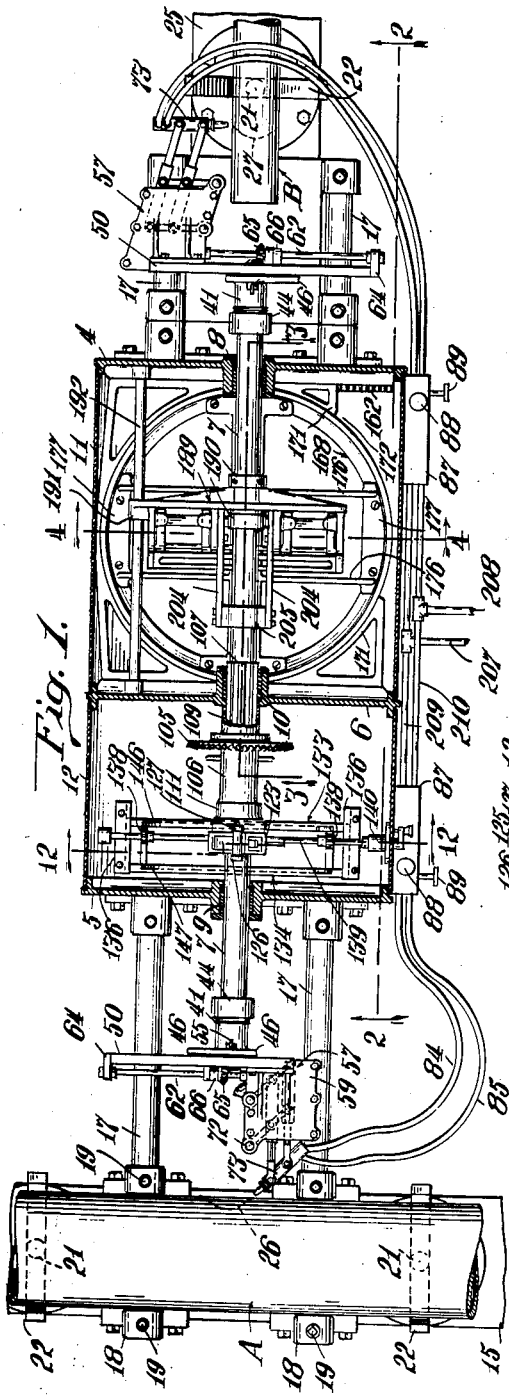
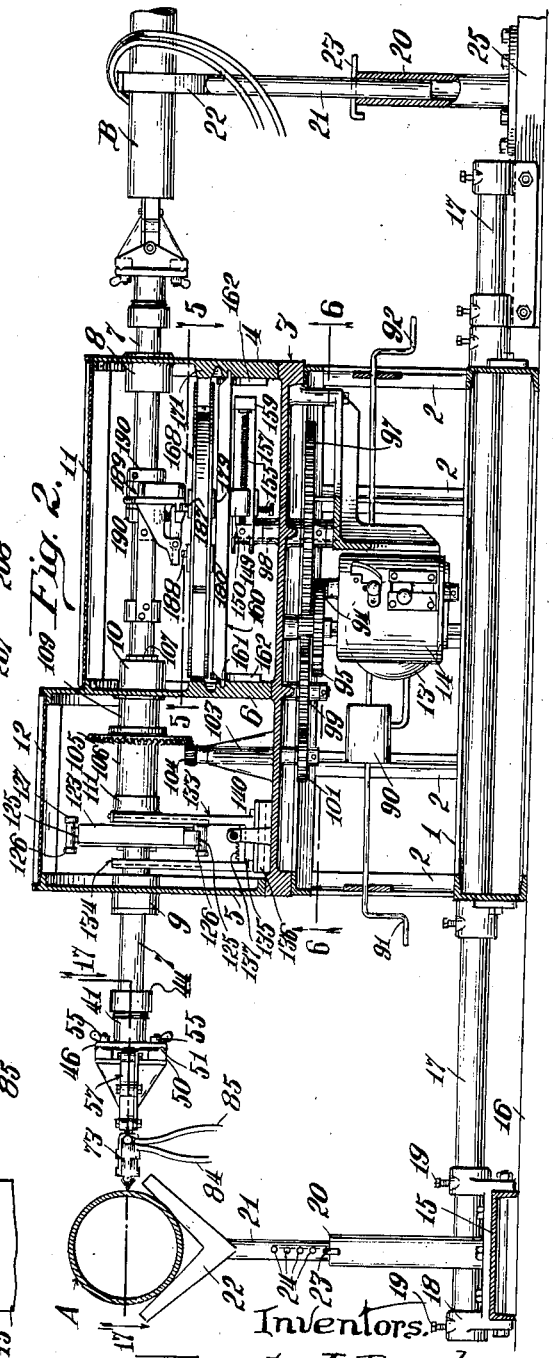
Inventors.
Frank J. Douglass
and Albert S. McCawley
Attorneys.

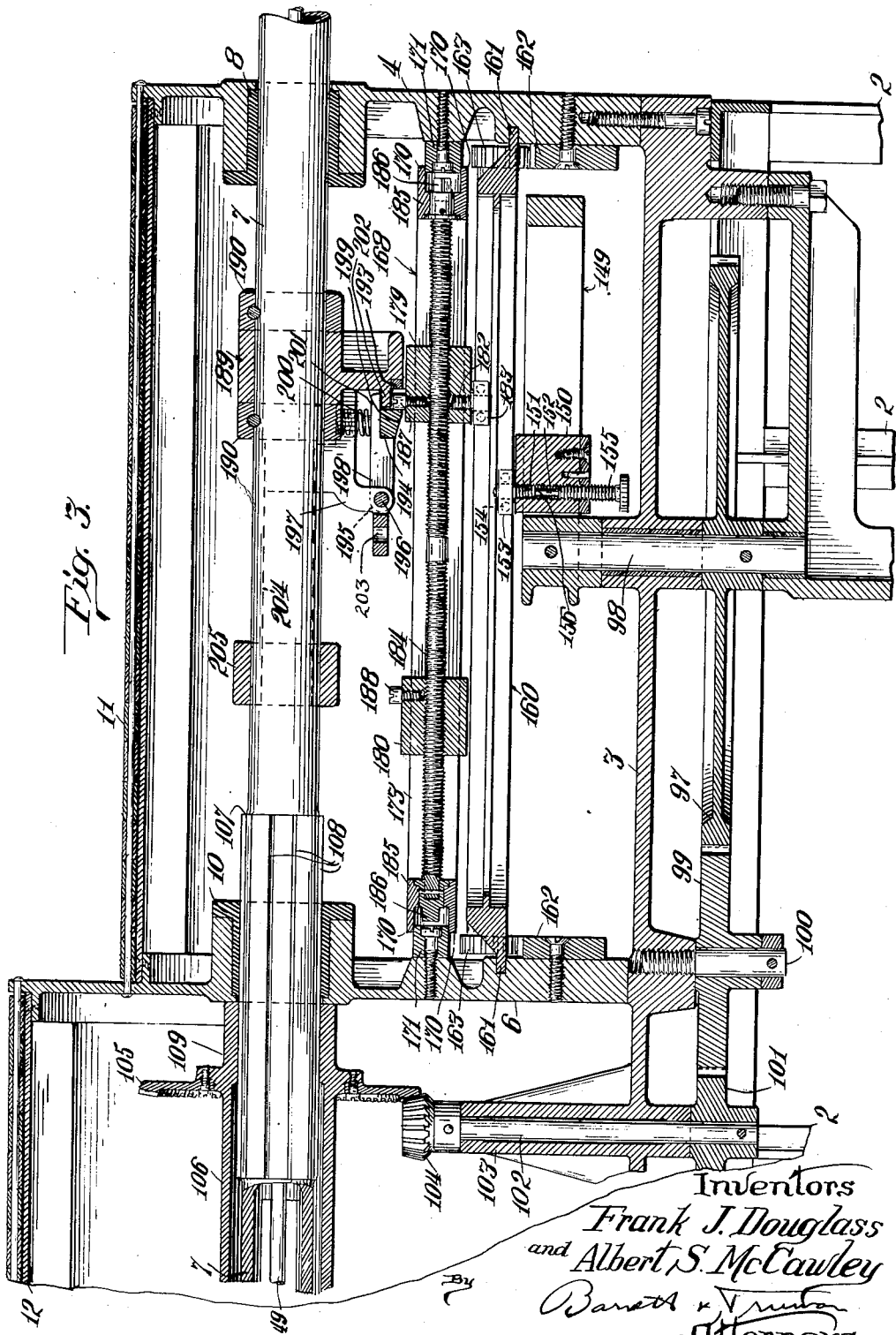

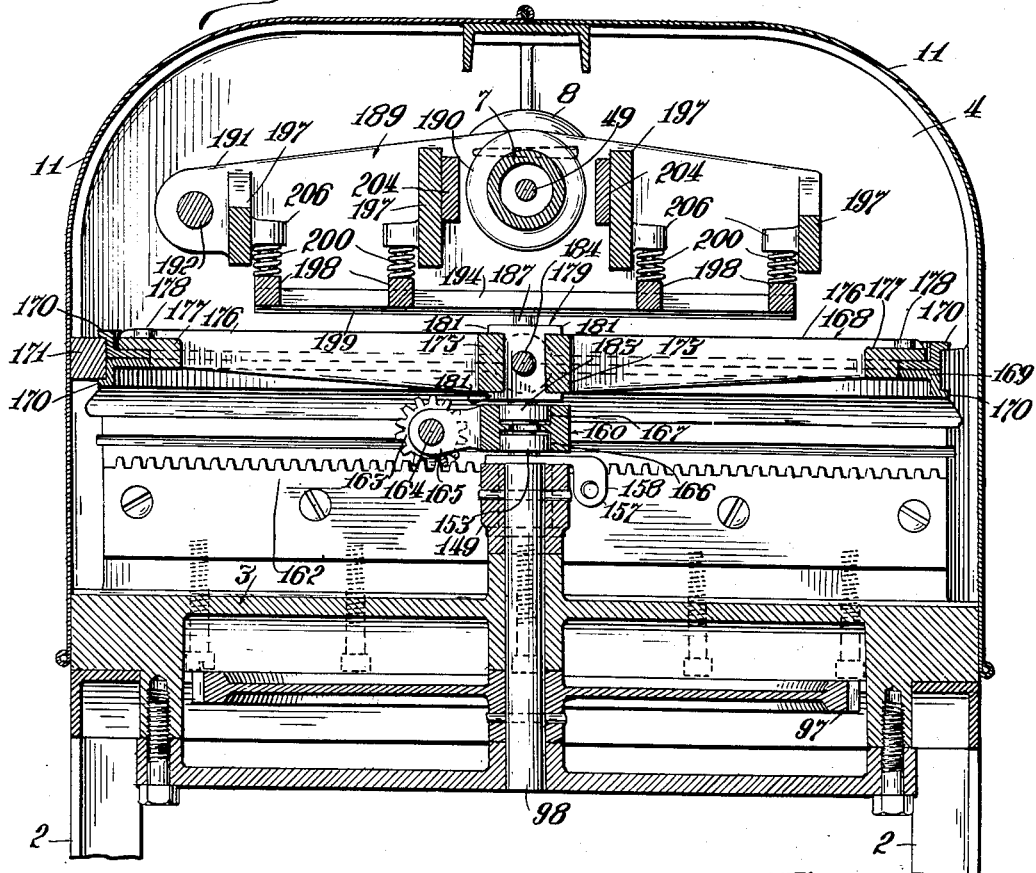
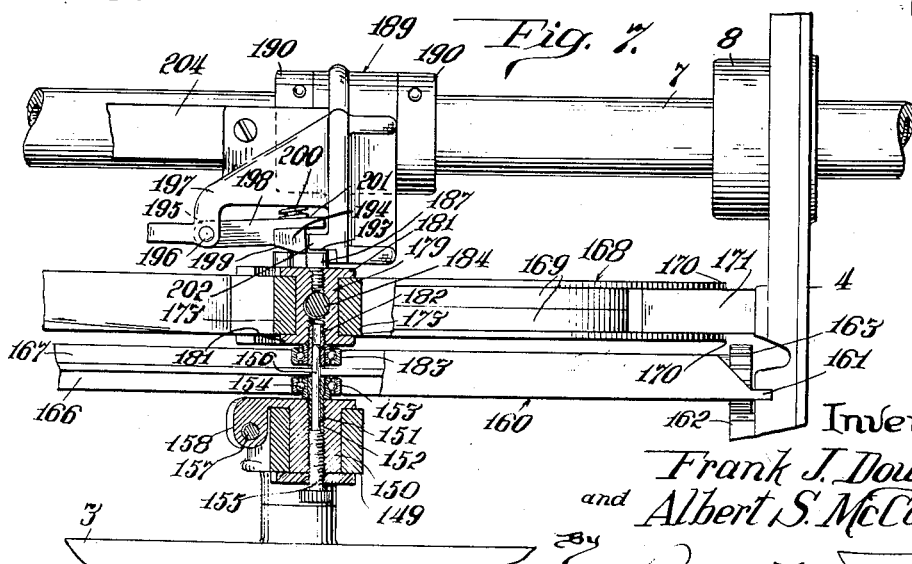

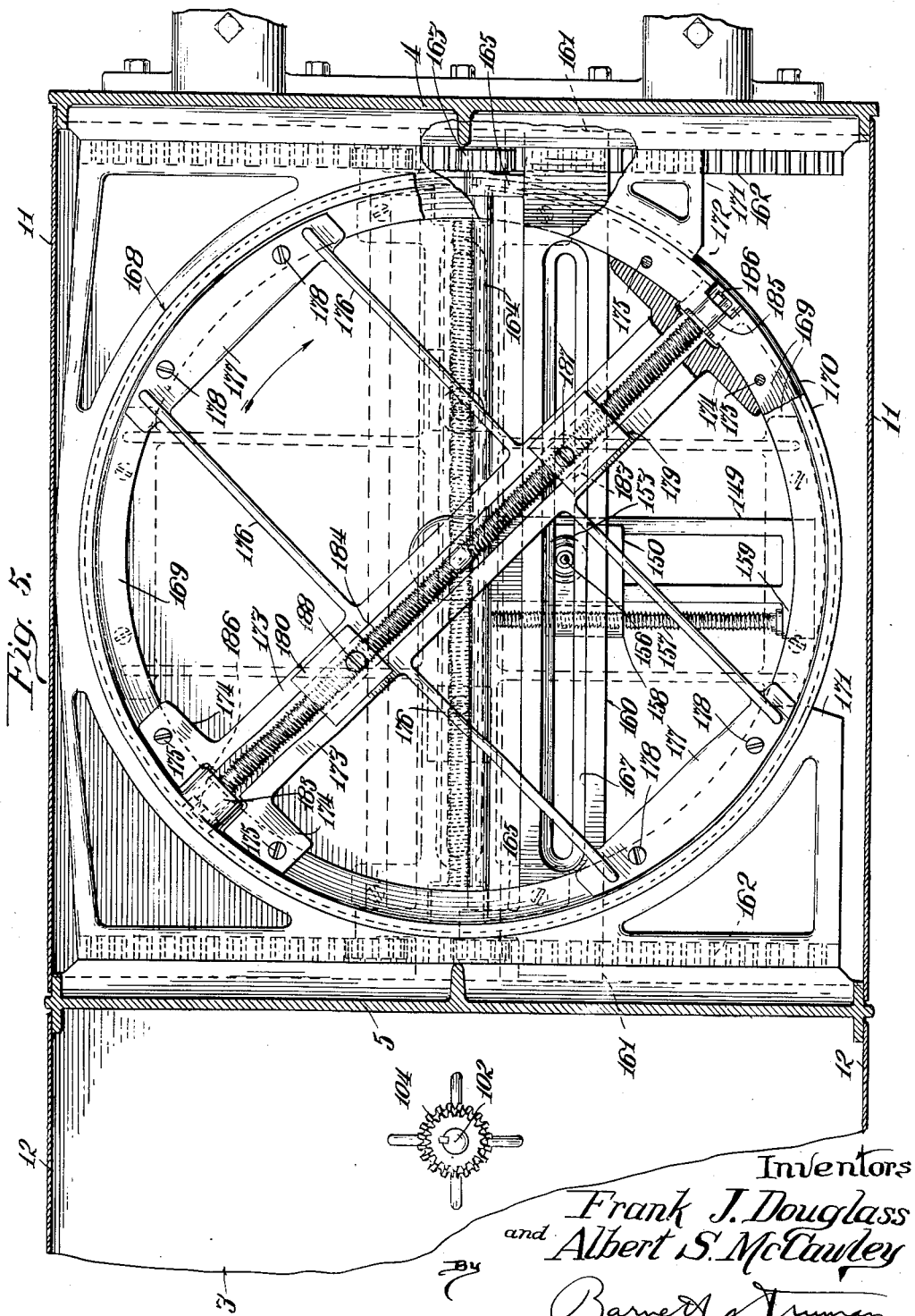

May 10, 1932.  F. J. DOUGLASS ET AL  1,858,078
APPARATUS FOR CUTTING AND BEVELING PIPES
Filed Jan. 10, 1931   8 Sheets-Sheet 5
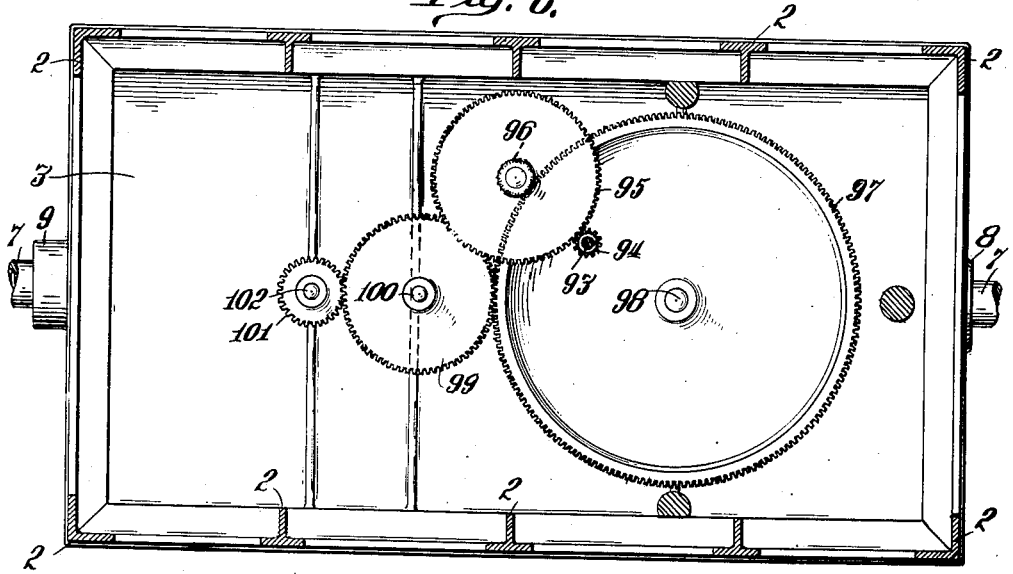
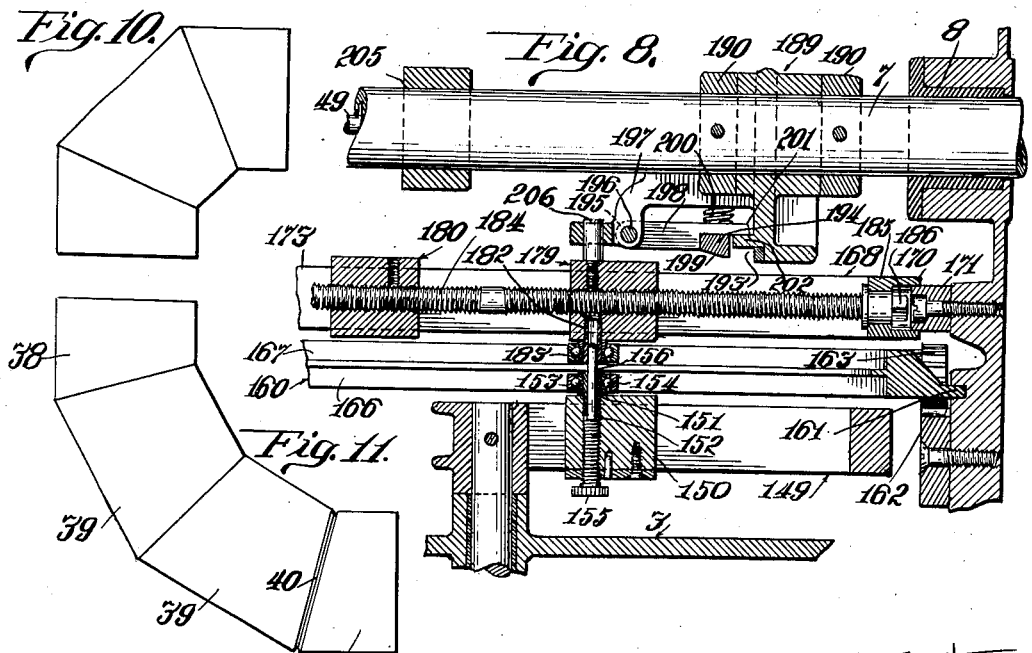
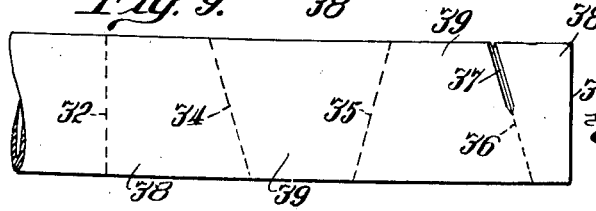
Inventors
Frank J. Douglass
and Albert S. McCawley
by Barnett Truman
Attorneys.

May 10, 1932.  F. J. DOUGLASS ET AL  1,858,078
APPARATUS FOR CUTTING AND BEVELING PIPES
Filed Jan. 10, 1931   8 Sheets-Sheet 6
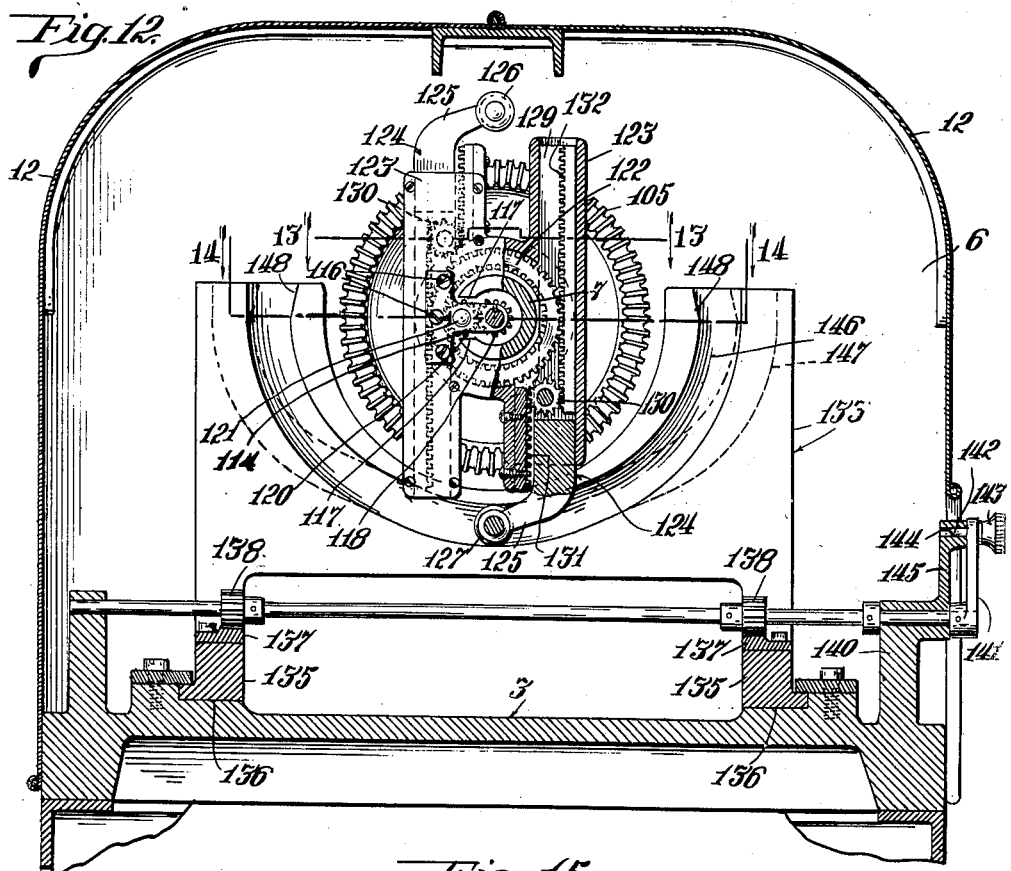
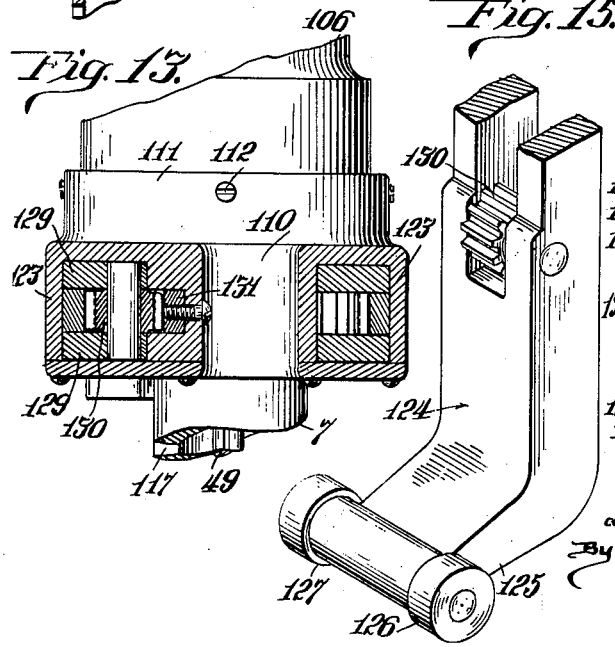
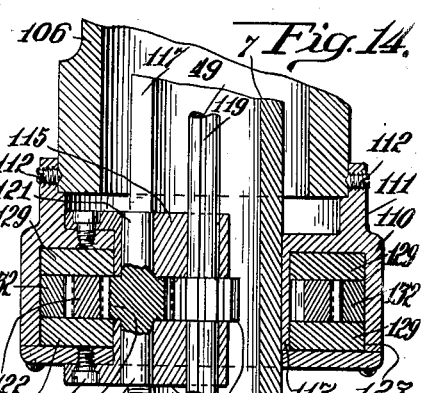
Inventors
Frank J. Douglass
and Albert S. McCawley
By
Attorneys.

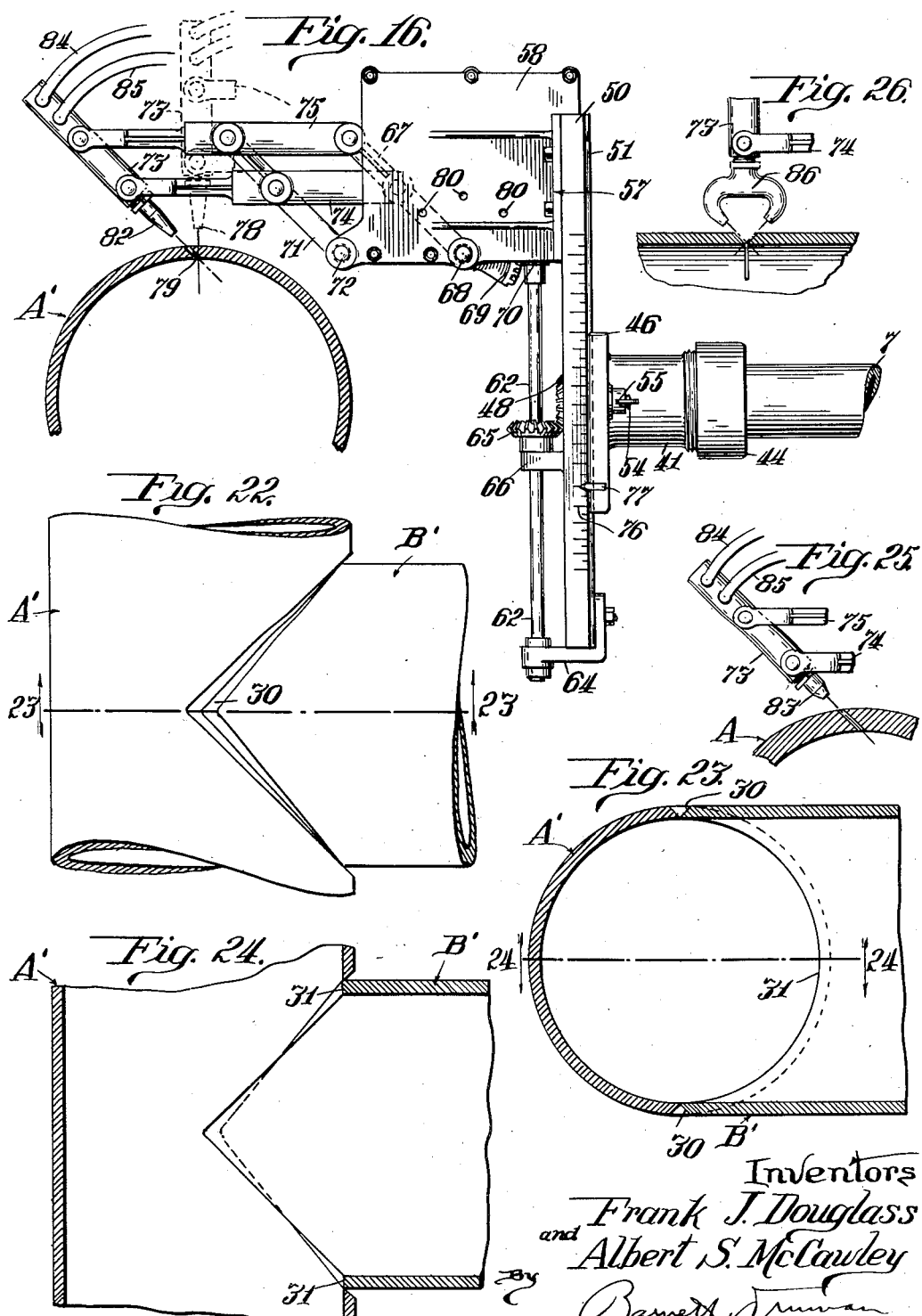

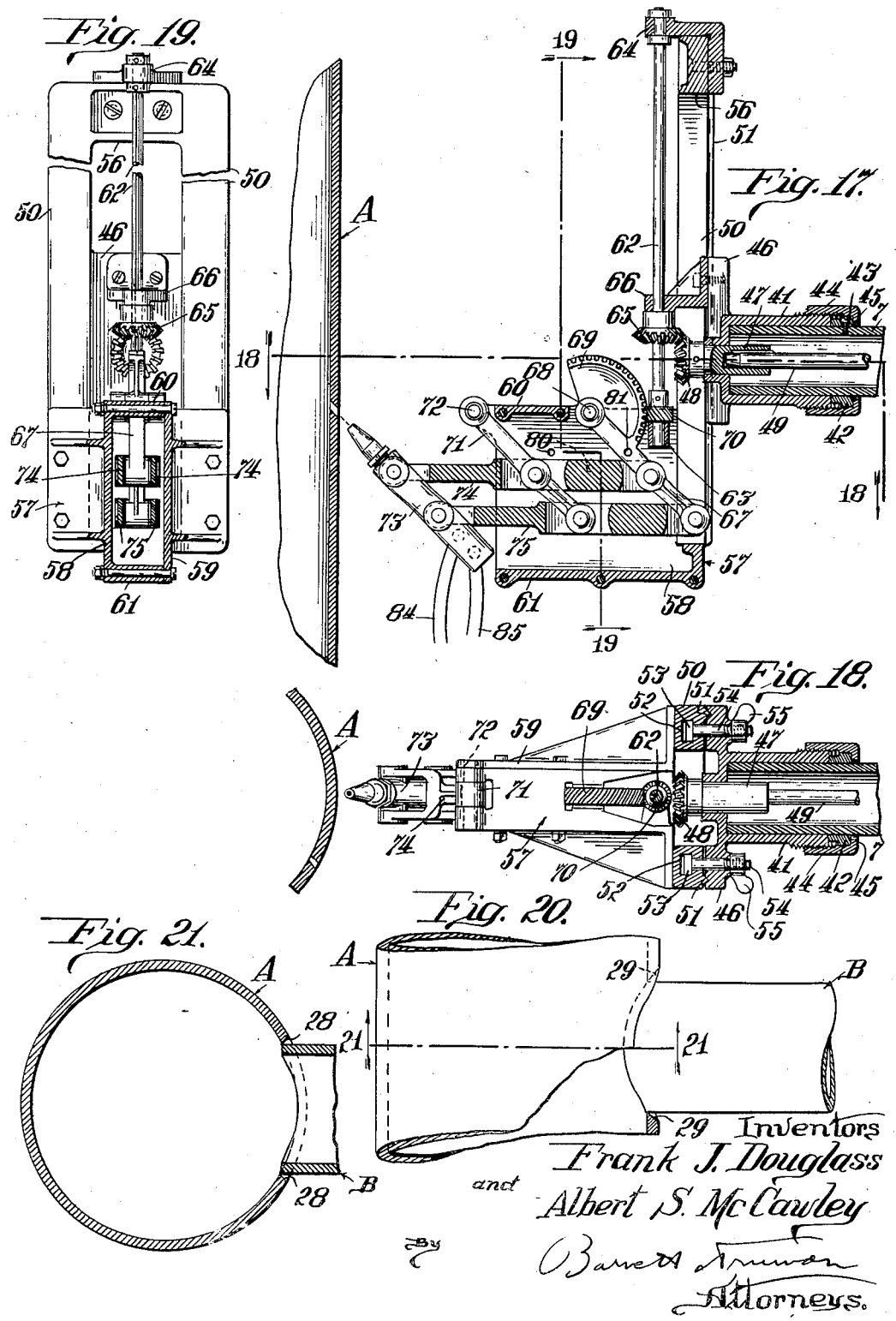

Patented May 10, 1932

1,858,078

UNITED STATES PATENT OFFICE

FRANK J. DOUGLASS AND ALBERT S. McCAWLEY, OF CHICAGO, ILLINOIS, ASSIGNORS TO DOUGLASS BROTHERS COMPANY, OF CHICAGO, ILLINOIS, A CORPORATION OF ILLINOIS

APPARATUS FOR CUTTING AND BEVELING PIPES

Application filed January 10, 1931. Serial No. 507,978.

This invention relates to certain new and useful improvements in a pipe cutting and beveling apparatus, and more particularly to an improved machine for automatically preparing pipe intersections and joints for welding.

In making pipe T's or crosses or similar joints or connections, it is necessary to cut the non-circular opening in the side of one pipe section and a correspondingly curved end portion on the other pipe section, these curved cuts varying in size and shape for each pipe diameter, and for each combination of pipe diameters when one of the pipes is smaller than the others. When performed by hand this is a slow and laborious procedure, and the cuts cannot be made evenly with a cutting torch so that further machining or smoothing processes are necessary in order to prepare the pipe ends for welding. Furthermore, it is necessary to bevel these cut surfaces and to vary the bevel on one or both of the surfaces at different positions along the cut in order to provide a proper channel for the soldering metal used in the welding process. The beveled surfaces must be different for a reducing joint, that is when pipes of different diameters are connected, than they are for a T or cross formed of pipe sections of similar diameters. The present improved machine is adapted to automatically make continuous clean cuts in one or both of the pipe sections and simultaneously cut the proper bevel on these surfaces, whereby the pipe sections will be properly shaped for the welding process without further preparation. The machine is adapted to cut pipes of a variety of diameters within the limits of the particular machine, and is also adapted to cut pipes having walls of various thicknesses. The machine is also adapted for cutting and beveling pipe sections for L bends or multi-piece bends.

Briefly described, the machine comprises a supporting frame carrying a rotary and longitudinally movable shaft at each end of which is mounted a cutting torch. Means is provided adjacent one end of the shaft for supporting a pipe section with its longitudinal axis in prolongation of the axis of the shaft, and at the other end of the shaft means is provided for supporting a pipe section with its longitudinal axis in the plane of the axis of the shaft but at right angles thereto. Means is provided for rotating and simultaneously reciprocating the shaft, and the torches are offset from the axis of the shaft so that they will follow curved non-circular closed paths as the shaft is moved. The torch at one end of the shaft is adapted to cut the opening in the side of the pipe section positioned at right angles to the axis of the shaft. The torch at the other end of the shaft is adapted to make a correspondingly curved cut at the end of the branch pipe. Means is provided for automatically varying the inclination of the torches as they are revolved through their respective orbits so as to bevel the cut surface at the desired angle. The shaft moving mechanism is adapted to reciprocate the shaft through two complete cycles of reciprocations for each rotation of the shaft when preparing pipes for T joints. By a simple adjustment in the mechanism, the same shaft moving apparatus is adapted to move the shaft through only one cycle of reciprocation for one rotation of the shaft when cutting pipes for angle bends. When unbeveled cuts are to be made or cuts with fixed bevels, the torches may be locked in position for making these cuts. Means is provided for making a double-beveled cut when cutting sections for angle bends, whereby both of the separated ends of the pipe sections formed by the single cut are finished and properly beveled. The shaft moving means is entirely reversible, for reasons that will hereafter be made apparent.

The machine disclosed and claimed in this present application is an improvement on the apparatuses disclosed and claimed in the co-pending applications of Frank J. Douglass, Serial No. 478,269, filed August 27, 1930, and of Frank J. Douglass and Albert S. McCawley, Serial No. 493,820, filed November 6, 1930, in which prior applications many of the features herein disclosed are broadly claimed.

The principal object of this invention is to provide an improved pipe cutting and beveling apparatus such as briefly described hereinabove and disclosed more in detail in the specifications which follow.

Another object is to provide improved means for varying the bevel of the cut surfaces on the pipe sections.

Another object is to provide improved means for rotating and reciprocating the operating shaft.

Another object is to provide improved means for imparting either one or two reciprocations at simple harmonic motion to the operating shaft for each rotation of the shaft.

Another object is to provide an improved apparatus adapted to either separately or simultaneously cut both sections of pipe adapted for forming a T joint or a cross connection.

Another object is to provide improved means for cutting an opening in a pipe for forming a T joint for receiving pipes of any desired diameter up to and including the full diameter of the cut pipe.

Another object is to provide an improved machine adapted for alternatively cutting and beveling pipe sections for T joints or intersections, for angular or L bends, or for cutting and beveling straight sections of pipe.

Another object is to provide a machine of this type which is reversible so that the torches can be moved in either direction over any portion of their paths.

Another object is to provide a machine adapted to make similarly shaped and beveled cuts in pipe sections of the same effective diameter but having different wall thicknesses.

Another object is to provide an improved machine of this type having means for controlling the travel of the torches and for controlling the supply of combustion fluids thereto, both such means being positioned easily accessible to the particular torch that is being operated.

Another object is to provide an improved apparatus for cutting and beveling pipe sections easily, quickly and entirely automatically, and in a single operation so that no additional beveling of the cut surfaces is necessary prior to the welding of the pipes.

Other objects and advantages of this invention will be more apparent from the following detailed description of one approved form of apparatus built and operating according to the principles of this invention.

In the accompanying drawings:

Fig. 1 is a plan view of the entire machine in operation, the inclosing casing being shown in section substantially in the horizontal plane of the axis of the operating shaft.

Fig. 2 is a side elevation of the machine, the supporting frame and inclosing housing being shown in longitudinal vertical section taken substantially on the line 2—2 of Fig. 1.

Fig. 3 is a longitudinal vertical section of a portion of the machine, the view being taken substantially on the line 3—3 of Fig. 1 and on a larger scale.

Fig. 4 is an enlarged transverse vertical section, taken substantially on the line 4—4 of Fig. 1.

Fig. 5 is an enlarged horizontal section taken substantially on the line 5—5 of Fig. 2. In Fig. 5 certain of the operating parts are shown in a different position from that shown in Figs. 1 and 2.

Fig. 6 is an inverted horizontal section, taken substantially on the line 6—6 of Fig. 2.

Fig. 7 is an enlarged detail elevation, partially in vertical section, showing a portion of the operating mechanism adjusted for forming a T joint in pipe sections of similar diameters.

Fig. 8 is a view similar to Fig. 7 showing the same portions of the apparatus adjusted for cutting pipe sections for angle bends.

Fig. 9 shows a section of pipe on which is indicated the character of the cuts made therein for forming sections for angle bends.

Figs. 10 and 11 show samples of the pipe sections joined together for making angle bends.

Fig. 12 is a transverse vertical section, on an enlarged scale, taken substantially on the line 12—12 of Fig. 1.

Fig. 13 is a partial horizontal section, taken substantially on the line 13—13 of Fig. 12.

Fig. 14 is a similar horizontal section taken substantially on the line 14—14 of Fig. 12.

Fig. 15 is a perspective view of the lower portion of one of the reciprocating arms shown in Fig. 12.

Fig. 16 is an elevation of one of the torch-carrying assemblies, the torch being shown rotated to a position 90° from that shown in Figs. 1 and 2, and positioned for forming a T joint in pipes of the same diameter.

Fig. 17 is a horizontal section through the torch-carrying assembly, the view being taken substantially on the line 17—17 of Fig. 2.

Fig. 18 is a vertical section taken substantially on the line 18—18 of Fig. 17.

Fig. 19 is a vertical section taken substantially on the line 19—19 of Fig. 17.

Fig. 20 is a plan view, partially broken away, of a T joint for which the pipe sections are cut when set substantially in the positions shown in Figs. 1 and 2.

Fig. 21 is a vertical section, taken substantially on the line 21—21 of Fig. 20.

Fig. 22 is a plan view of a T joint formed of pipe sections of the same diameter.

Fig. 23 is a vertical section taken substantially on the line 23—23 of Fig. 22.

Fig. 24 is a horizontal section taken substantially on the line 24—24 of Fig. 23.

Fig. 25 is a detail view similar to a portion of Fig. 16, but showing the apparatus adapted for cutting a pipe having a thicker wall than that shown in Fig. 16.

Fig. 26 is a detail view similar to a portion of Figs. 16 and 25 showing the torch provided with an alternative tip for making a double beveled cut for angle bends.

The supporting frame, in the form here shown, comprises a base 1 formed of assembled angle beams or castings, from which base extend a plurality of vertical posts or pillars 2 which support the intermediate bed or table 3. Parallel end walls 4 and 5 and an intermediate wall 6 are supported from the table 3. The main operating shaft 7 which is of hollow tubular form is journaled in bearings 8, 9 and 10 in the respective walls 4, 5 and 6, the shaft 7 being rotatable and longitudinally slidable in these bearings and extending beyond the two end walls 4 and 5 of the supporting frame so that a torch assembly may be mounted on each projecting end of the shaft. Removable inclosing housings 11 and 12 supported by the walls 4, 5 and 6 enclose the mechanism supported above table 3 for imparting the necessary rotary and reciprocating movements to main operating shaft 7, and also for varying the inclination of the cutting torches to produce the desired bevel on the cut surfaces. These mechanisms will be hereinafter separately described in detail. Beneath the table 3 is suspended the driving motor 13, the change speed gear box 14, and the gear trains for driving therefrom the mechanism inclosed in housings 11 and 12. One of the pipe sections to be cut (designated A in Figs. 1 and 2) must be supported at a suitable distance beyond one end of the cutting machine so that the central longitudinal axis of the pipe section will be in the same horizontal plane as the axis of operating shaft 7 but positioned at right angles to said axis. An opening is to be cut in the side of pipe section A for receiving the end of branch pipe B (shown at the right of Figs. 1 and 2.) For supporting the pipe section A, a base member 15 is mounted on the foundation indicated at 16, and is fixedly but adjustably spaced from the base 1 of the machine by spacing bars or pipes 17 which extend through openings in ears or brackets 18 on the bases 1 and 15 and are locked in place by screw bolts 19. The supporting base 15 extends in a direction transverse to the axis of shaft 7 and supports a plurality of vertical hollow standards 20 which telescopically receive the posts 21 at the upper ends of which are forks 22 for supporting the pipe section. A removable pin 23 positioned in one of a series of openings 24 in post 21 determines the height to which fork 22 is adjusted. It will be apparent that the central axis of the pipe section A will always be positioned directly above the posts 21, and the posts and forks are adjusted vertically so that this central axis of the pipe will lie in the same horizontal plane as the axis of shaft 7. For example, if a smaller pipe than that illustrated in Figs. 1 and 2 is to be supported, the posts 21 will be elevated, and if a larger pipe is to be supported the posts will be lowered. The branch pipe B is to be supported at the opposite end of the machine so that its central axis will lie in prolongation of the axis of shaft 7. The supporting base 25 is similar to base 15 but extends at right angles thereto, and is similarly spaced from the main base 1 by means of the spacing pipes or bars 17. Similarly adjustable forked posts or horses are provided for supporting the pipe section B, as will be apparent from the drawings.

It will be apparent that when a welded T joint is to be formed, an opening must be cut in the side of one pipe section, and the end of another pipe section must be cut on a corresponding curve so as to fit this opening. For a so-called "reducing joint" such as shown in Figs. 1, 2, 20 and 21, a small branch pipe B is to be welded into the side of the larger pipe or leader A. In this case an opening such as 26 (Fig. 1) must be cut in the side of pipe A and the end of pipe B must be cut as indicated at 27, it being obvious that the general form or curvature of these two cuts will be substantially identical. When pipes of the same diameter are to be joined, the cuts will be of the form indicated in Figs. 22, 23 and 24. It will now be apparent that the paths that must be followed by the cutting torches will vary in accordance with the sizes of the pipes that are to be cut, and also in accordance with the relative sizes or diameters of the two pipe sections that are to be joined together.

In order to provide a proper channel for receiving the welding metal, it is necessary that certain of these cut surfaces be beveled, and in certain cases the inclination of this bevel must be varied at different locations along the closed path described by the cut surface. For example, in a reducing joint such as shown in Figs. 20 and 21, the edges of the opening cut in main pipe A may be substantially unbeveled or normal to the surface of the pipe at the points 28, but must be beveled outwardly at an angle of substantially 45° to the surface of the pipe at the points 29 spaced 90° from the points 28. For a joint of this type, the cut end of branch pipe B may be unbeveled since this branch pipe is adapted to fit within the inner edge of the opening in pipe A. For a pipe joint formed by pipes of the same diameter as shown in Figs. 22, 23 and 24, the cuts must be beveled in a different manner. It will be noted that the opening in pipe A' is beveled outwardly throughout its entire length. The end of branch pipe B' is beveled outwardly at the points 30 but is unbeveled at the points 31 spaced 90° therefrom. Standard pipe cutting regulations require that these beveled surfaces be varied in accordance with certain fixed rules for different types of joints, and the present machine may be designed for cutting any such variably beveled surfaces, the contour of the beveled surface depending entirely upon the contour of the slots formed in the directing cams hereinafter described.

For cutting off a straight section of pipe, as indicated as 32 or 33 in Fig. 9, it is desirable that the cutting torch be positioned permanently normal to the surface of the pipe so as to make an unbeveled cut. For forming angle bends such as illustrated in Figs. 10 and 11, it is necessary that a continuous cut be made in a plane extending at an angle to the central axis of the pipe, as illustrated at 34, 35 and 36 in Fig. 9. By beveling both sides of one of these cuts equally in opposite direction, as indicated at 37 in Figs. 9 and 26, the ends of both sections of the severed pipe may be simultaneously prepared for welding. For example, when the sections 38 and 39 are separated by a single beveled cut as indicated at 37 in Fig. 9, these sections may be fitted together as indicated in Fig. 11 with the necessary channel 40 at the connected ends for receiving the welding metal.

The general operations that are to be performed by this apparatus and the purposes for which it is designed to function having now been briefly described, we will describe the detailed mechanism for carrying out these operations. One of the cutting torch assemblies and its supporting and actuating mechanisms will now be described, referring more particularly to Figs. 1, 2, 16, 17, 18 and 19. The removable torch assembly is carried by a hollow hub or socket member 41 adapted to fit over the end of main operating shaft 7 against a flange or collar 42 secured in place on the shaft by means of set screw 43. An internally threaded annular collar 44 which screws onto the threaded end portion of hub 41 has an inwardly extending flange 45 at its inner end engaging the fixed collar 42 so that when clamping collar 44 is screwed in place the hub 41 will be clamped against the fixed collar 42 and held securely in position upon the operating shaft 7. A radially extending bracket or supporting plate 46 is formed integrally on the outer end portion of hub or socket member 41, and a short stub shaft 47 having beveled gear 48 at its outer end is journaled in the end wall of hub 41 coaxially with shaft 7. The inner end of stub shaft 47 has a non-circular keyed socket or opening therein adapted to receive the correspondingly shaped end portion of an inner shaft 49 which is journaled coaxially within the main operating shaft 7 and extends substantially throughout the length thereof. Means hereinafter described is provided for rotating inner shaft 49 relatively to main operating shaft 7 so as to impart the desired tilting movement to the torch. The torch-supporting bracket also includes a radially adjustable supporting frame which is secured to and carried by the fixed bracket member 46. This frame comprises a pair of parallel side bars 50, each provided with a rib 51 engaging a corresponding guide groove in the fixed frame 46. The bar 50 is formed with an internal channel 52 adapted to slidably receive the head 53 of a locking bolt 54 mounted in an opening in fixed bracket 46 and having a threaded inner end for engagement by the clamping nut 55. The side bars 50 are integrally connected at one end by a cross member 56, and are secured at the opposite ends to the base plate 57 of a housing comprising parallel side plates 58 and 59 connected by inner and outer end walls 60 and 61 respectively. A radially extending counter-shaft 62 is journaled at one end in a bearing 63 positioned between the side walls 58 and 59 of the housing, and is journaled at its other end in a bracket member 64 mounted on the cross member 56. A bevel gear 65 is slidably keyed on counter-shaft 62 and is held in mesh with the bevel gear or pinion 48 by means of a bracket 66 mounted on the fixed bracket 46. It will now be apparent that as the torch supporting frame is adjusted radially with respect to shaft 7, the counter-shaft 62 will slide through the hub of gear 65, but that in any position of adjustment of this assembly rotary motion will be transmitted from inner control shaft 49 to counter-shaft 62 through the constantly meshing bevel gears 48 and 65. An operating lever 67 is fulcrumed at its inner end 68 between the side walls 58 and 59 of the housing, this lever being formed with a gear sector 69 which meshes with a worm pinion 70 keyed on counter-shaft 62. A second lever 71 similar to lever 67 is fulcrumed in a similar manner at 72 in the housing, and a pair of parallel links 74 and 75 are pivotally connected with the levers 67 and 71 and the torch frame 73 so that the torch will swing in parallel relation to the two levers at all times.

The entire torch assembly is adjusted radially of operating shaft 7 in accordance with the size of pipe A that is to be cut. One of the side bars 50 may be calibrated as indicated at 76 to cooperate with a pointer or index 77 on the fixed bracket 46 to indicate the proper position of adjustment for any standard pipe size. At the same time, the proper adjustment of the mechanism hereinafter described for reciprocating shaft 7 will move the initial position of this operating shaft longitudinally to such a point that as the shaft revolves the torch body 73 will move at a constant distance from the inner surface of the pipe section and will always be directed toward a predetermined closed path described on this inner surface of the pipe. If the torch is in the position shown in dotted lines at 78 in Fig. 16, the cutting jet will be directed radially or normally against the pipe surface and a straight unbeveled cut will be made in the pipe. If the torch is moved over to the position shown in solid lines (Fig. 16) the cut surface will be beveled outwardly as indicated at 79. It will be noted that in either of these positions of the torch, or in any intermediate position, the cutting jet is directed against the same point on the inner surface of the pipe, which is a point in the predetermined curve described on this inner surface, so that the opening cut in the pipe will have the same size and configuration, although the bevel imparted to the cut surface may be varied as desired by adjusting the position of the torch 73. If the entire cut is to be unbeveled, or is to have a bevel of fixed inclination throughout its length, the torch may be locked in position. In the example here shown, a plurality of openings 80 are provided in one of the side plates 59 of the housing, and a pin may be inserted through one of these openings and a corresponding opening 81 in lever 67 so as to lock the torch in some fixed angular relation to the surface of the pipe. If the bevel of the cut surface is to vary at different positions along its length, this is accomplished by swinging the torch with relation to its supporting bracket as the torch assembly is revolved and reciprocated. This swinging motion is accomplished by means of the relative rotation of inner control shaft 49 with relation to main operating shaft 7, this movement being transmitted through bevel gears 48 and 65, counter-shaft 62, worm gear 79, sector 69, and the swinging parallel levers and links, so as to vary the angular inclination of torch 73 with respect to the inner surface of the pipe.

As has already been noted, the main torch body will always be directed toward a closed path described on the inner surface of the pipe, and this torch body will always be adjusted to a fixed distance from this inner surface. However, pipes of different thicknesses must be cut, and it is desirable that the torch tip from which the cutting jet is projected should be positioned at a substantially constant distance from the outer surface of the pipe so as to most effectively position the cutting flame. In order to accomplish this, the cutting torch is provided with a plurality of alternative tips of different lengths, the proper tip being selected in accordance with the thickness of pipe that is to be operated upon. By a comparison of Figs. 16 and 25, it will be noted that the torch body 73 is positioned at the same inclination and at the same distance from the inner surface of the pipe in both figures. However, in Fig. 16 a longer tip 82 is used for cutting the relatively thinner pipe section, whereas in Fig. 25 a shorter tip 83 is used for cutting the thicker pipe shown in this figure, the distances of the torch tips from the outer surface of the pipe being substantially the same in both cases.

The cutting torches here shown are of the standard oxyacetylene type, although it will be apparent that other types of cutting torches might be used in this general apparatus. Each torch is separately supplied with the combustion fluids (in this case oxygen and acetylene) through the flexible conduits 84 and 85.

The torch assembly at the left-hand end of the apparatus as shown in Figs. 1 and 2, which cuts the opening in the side of the main pipe or leader, has been specifically described by way of example, but the torch assembly used at the right-hand end of the machine for cutting the end of the branch pipe is of substantially the same construction, although the proportions of the supporting members are varied somewhat in view of the fact that this latter torch is normally positioned in a somewhat different angular relation to the axis of the operating shaft. The last described torch assembly is also used for cutting pipe sections for angle bends such as shown in Figs. 9, 10 and 11. In this case, for making the double-beveled cut hereinabove referred to, the torch body is locked in position normal to the surface of the pipe, and a double torch tip such as shown at 86 in Fig. 26 is substituted for the single tip ordinarily used. It will be noted that the two cutting jets are projected inwardly at similar angles toward a point on the path of travel of the torch described on the inner surface of the pipe section. In this way both sections of the severed pipe will be simultaneously and similarly beveled.

The two fluid supply pipes 85 and 84 for each torch lead to a valve fitting 87 which is conveniently positioned on the supporting frame adjacent that end of the machine at which the respective torch is located. This fitting is provided with separate valves 88 and 89 for controlling the two fluids. It will be apparent that if the torch were revolved continuously in one direction the flexible conduits 84 and 85 would become kinked or twisted about the apparatus, and for this reason the torch will ordinarily be moved through one revolution in one direction for cutting one pipe section, and will then be revolved in the opposite direction for making the next cut, and so on. It is also desirable that the torch be movable in either direction so that it may retrace a portion of its path in case for some reason the cut has not been completed effectively. Consequently the entire mechanism hereinafter described for imparting the desired rotary and reciprocating motions to the different parts is entirely reversible and operates equally well in either direction. To accomplish these reverse movements, the operating motor 13 is reversible and is provided with a reversing switch 90 from which similar operating handles 91 and 92 extend to convenient positions at the two ends of the apparatus. It will thus be noted that valve mechanisms for controlling the cutting jets, and a reversing lever for controlling the operating mechanism are conveniently positioned adjacent each torch so that the operator may have complete control of the cutting apparatus while observing its operation.

Referring now more particularly to Figs. 2 and 6, the reversible motor 13 is connected with the driving shaft of change-speed gear box 14, and on the driven shaft 93 of this change-speed gear assembly is a spur pinion 94 meshing with a spur gear 95. On the hub of gear 95 is a small pinion 96 which meshes with a large spur gear 97 secured on the lower end of a vertical shaft 98 which is journaled in the supporting table 3, the upper end of this shaft projecting into the chamber from between the partitions 4 and 6. The large gear 97 meshes with an intermediate gear 99 journaled on stub shaft 100 projecting down from table 3, the gear 99 meshing with a small gear 101 secured on the lower end of a vertical shaft 102 which is journaled in table 3 and in a standard 103 projecting upwardly into the chamber between partitions 5 and 6.

Referring now to Figs. 1, 2, 3 and 12 to 15 inclusive, a bevel pinion 104 secured on the upper end of shaft 102 meshes with a bevel gear 105 mounted on the tubular casing 106 which surrounds shaft 7 and is held from motion toward the right, Fig. 3, that is away from gear 104, by abutting against the intermediate partition 6. A somewhat enlarged intermediate portion 107 of main operating shaft 7 is formed with a plurality of longitudinally extending keyways 108 in which slidably engage keys formed in or secured to the hub 109 of casing 106. In this manner the operating shaft 7 will be rotated through bevel gears 104 and 105 and casing 106, but the shaft is free to move longitudinally through this rotating means in either direction. A rotatable gear housing 110 has a laterally extending annular flange 111 secured by some suitable means such as screws 112 to the left-hand end of tubular casing 106.

Casing 110 has an inner annular sleeve 113 journaled on operating shaft 7 so that the shaft is freely slidable through the casing 110. A pair of similar supporting blocks or ears 114 and 115 are secured at their outer ends as at 116 to the housing 110 and project inwardly through a longitudinally extending slot 117 formed in operating shaft 7. The inner control shaft 49 previously referred to is journaled in these ears 114 and 115, and a pinion 118 mounted between the ears or blocks 114 and 115 is provided with a key engaging in the longitudinally extending keyway 119 formed in shaft 49 so that this shaft can move longitudinally through the gear 118 but the gear and shaft are always keyed together for simultaneous rotation. The gear 118 meshes with a small pinion 120 formed on a stud shaft 121 journaled in the blocks 114 and 115. The pinion 20 meshes with an internal series of gear teeth formed in an annular gear ring 122. At diametrically opposite sides of housing 110 are formed two similar parallel housings or slideways 123 in each of which is slidably engaged an operating arm 124. At one end of each arm 124 is a lateral extension 125 carrying a pair of rollers 126 and 127 adapted to engage slots in the operating cams hereinafter described. These rollers are positioned at the opposite ends of the two arms 124, and the lateral extensions 125 are for the purpose of bringing all of these rollers substantially into the same plane which includes the axis of the operating shaft. The inner portion of each arm 124 is slotted centrally at 128 to form two similar parallel side arms 129 between which is pivoted a pinion 130 meshing with a rack 131 secured within one end of housing 123. A movable rack 132 is slidable within slot 128 and meshes with the pinion 130 and also with an external series of gear teeth formed on the gear ring 122. It will be noted that both arms 124 have the same rack and gear connections with the annular gear 122 so that any radial or lateral movement imparted to one of the arms 124 will cause a similar movement of the other arm. In other words, the two sets of rollers 126 and 127 will always be at the same radial distance from the axis of the operating shaft. It will be noted that the rolling movement of pinion 130 on fixed rack 131 will cause the longitudinal movement of rack 132 to be always twice that of the operating arm 124 and in the same direction. This is a means for multiplying the movement imparted to the annular gear 122, and thence through pinions 120 and 118 to the inner operating shaft 49.

Two parallel cam plates 133 and 134 are mounted on a supporting base 135 which is movable along guideways 136 formed on bed or table 3 in a direction parallel to the axis of the operating shaft. Parallel racks 137 secured on the upper face of base 135 between the cam plates 133 and 134, are engaged by gear pinions 138 secured on shaft 139 extending transversely of the machine and journaled in brackets 140 formed on table 3. Shaft 139 is rotated by a crank 141 secured on one outer end thereof at the front of the machine, and the shaft and crank may be locked in three different positions of adjustment by means of a retractable pin 142 on handle 143 which may be engaged in a selected opening 144 in bracket 145 formed on the supporting frame. Cam plate 133 is formed with a cam slot 146 adapted to engage with and operate the two rollers 127. Similarly, cam plate 134 is formed with a cam slot 147 (shown in dotted lines in Fig. 12) adapted to engage with the two rollers 126. By suitably manipulating the crank 141, the cam assembly may be shifted laterally so as to bring either cam 133 into engagement with rollers 127 or cam 134 into engagement with rollers 126, or to leave the cam assembly in an intermediate neutral position in which neither set of rollers will be engaged by the cams.

The normally fixed cam slots 146 and 147 are designed with varying curvatures so that different portions thereof are at different radial distances from the axis of the operating shaft. When the cams are in "neutral" position, neither cam being in engagement with the rollers 126 or 127, no sliding movement will be imparted to either of the arms 124, and these arms as well as all of the gearing connections will rotate as a unit with the operating shaft 7 and inner-control shaft 49, and no relative rotation will be imparted to the inner shaft. This adjustment of the parts will be used when the cutting torches are to remain in a fixed position or inclination for making unbeveled cuts or cuts of a constant bevel. In such instances the torch will preferably be locked in this fixed position by the means hereinabove described. One of the cam slots (for example the slot 146) is designed for varying the inclination of the torch 73 for cutting pipes for a reducing joint or T such as shown in Figs. 1, 2, 20 and 21. The other cam (for example the cam slot 147) is designed for varying the bevel for a T connection of the type shown in Figs. 22, 23 and 24 where the pipes are of the same diameter. It will be apparent that by suitably designing these cam slots 146 and 147 any desired variations of the beveled surface may be obtained. It will be apparent that there are two similar halves to the cut surface in either of these types of joints, and for each rotation of the operating shaft one of the rollers (for example one roller 127) will pass through the length of the fixed cam slot and as this roller emerges from one end of the slot the other roller 127 will enter the opposite end of the slot and the series of reciprocations of the arms 124 will be repeated through the remaining half of the rotation of the operating shaft. Preferably the open ends of the cam slots are slightly flared as indicated at 148 to insure a proper engagement of the operating rollers with the cam slots. It will be understood that a single operating arm 124 might be used with a continuous or endless cam slot instead of the preferred mechanism hereinabove described.

The mechanism for reciprocating the operating shaft 7 will now be described, referring more particularly to Figs. 1 to 8 of the drawings. A longitudinally slotted crank arm 149 is secured to the upper end of the vertically operating shaft 98. A block or carriage 150 is slidable longitudinally in the slot of crank arm 149, that is in a direction radially of shaft 98. A small tubular shaft 151 is threaded into the upper end of an internally threaded vertical opening 152 in block 150, and a roller 153 is journaled on the upper end of shaft 151 preferably by means of ball bearings 154. A screw 155 is threaded into the lower end of the opening 152 in block 150, and a smooth pin 156 projects upwardly from screw 155 through the tubular shaft 151. In normal operation, when reducing joints are to be cut, the screw 155 will be moved down to the inoperative position shown in Fig. 3. For making certain types of cuts this screw 155 may be moved up to the locking position indicated in Figs. 7 and 8, as will be hereinafter described. An adjusting screw 157 (Figs. 2 and 5) is threaded through an ear 158 formed on one side of block 150, the other end of screw 157 being mounted in an ear 159 formed on the outer end of crank arm 149, wherein suitable means are provided for engaging the outer end of screw 157 to rotate the same and adjust the position of block 150 radially of operating shaft 98.

A slide member 160 extending longitudinally of the machine has tongues 161 at its opposite ends slidable in trackways formed in the vertical partitions 4 and 6 and extending transversely of the machine, that is at right angles to the axis of the operating shaft 7. Racks 162 are secured to the opposed inner walls of partitions 4 and 6, and pinions 163 secured to the opposite ends of a shaft 164 mesh with the respective racks 162, the shaft 164 being journaled in ears or brackets 165 projecting from the slide 160. The purpose of this rack and pinion mechanism is to cause the slide 160 to move equally at its two ends and thus prevent any binding of the tongues 161 in the slideways. The slide 160 is formed with a lower slot 166 which extends longitudinally thereof and receives the roller 153 previously described. The slide 160 is also formed with a second upper roller-receiving slot 167 which extends longitudinally thereof similarly to slot 166. It will now be seen that as the shaft 98 and crank arm 149 are moved through one complete revolution, the roller 153 will cause the slide 160 to reciprocate transversely of the machine through one complete cycle, that is through one complete reciprocation in each direction. Also the lengths of these reciprocations of slide 160 will depend upon the distance to which block 150 and roller 153 are adjusted radially toward or from the axis of shaft 98.

A horizontal rotatable member or turn-table 168 is positioned above the slide 160 and adapted to rotate about its center coaxially with vertical shaft 98. This turn-table 168 comprises a horizontally split ring portion 169, the two halves of which are bolted together and are each provided with outwardly extending annular flanges 170 projecting respectively above and below a fixed supporting plate 171 formed with a similar circular opening. A small sector of this supporting plate 171 is cut away as indicated at 172 in Fig. 5 in order to permit access to the rim of the turn-table at this location. The turn-table comprises a pair of similar spider members secured within the ring 165. Each spider member comprises a substantially diametrically extending arm 173 having a supporting plate 174 at each end bolted as at 175 to the ring 169, and transversely extending bracing arms 176 connected by a plate 177 bolted at 178 to the ring 169. The arms 173 are spaced apart in parallel relation so as to form a slot or guideway therebetween in which are mounted a pair of slide blocks or carriages 179 and 180, one at either side of the central axis of the turn-table. These carriages 179 and 180 are each formed with upper and lower laterally extending flanges 181 which extend over the arms 173 so as to hold the carriages slidably in position between the arms. One of these carriages, for example the carriage 179, has a short tubular shaft 182 secured in its lower side, and on the lower end of this shaft is mounted a roller 183 preferably by means of ball bearings. This roller 183 engages in the upper roller-receiving slot 167 of the slide 160. A screw 184 having its two halves oppositely threaded extends diametrically of the turntable between the arms 173, the two halves of the screw being meshed in correspondingly threaded openings in the respective carriages 179 and 180. The two end portions of screw 184 are journaled in hubs 185 formed between the mating sections of ring 169, and the opposite ends of the screw are provided with non-circular heads 186 adapted to be engaged by a suitable wrench or tool for rotating the screw and thus simultaneously adjusting the carriages 179 and 180 toward or from the central axis of the turn-table. The supporting frame 171 is cut away at 172, as already described, for the purpose of permitting access to one or the other of the heads 186 for the purpose of adjusting the screw 184. Similar removable pins or screws 187 and 188 having cylindrical upper ends are similarly mounted in the two carriages 179 and 180.

A slide carriage 189 is mounted on main operating shaft 7 between a pair of similar collars 190 which are keyed to the shaft, so that shaft 7 may rotate relative to carriage 189 but the shaft and carriage must move longitudinally together. An ear 191 at one end of carriage 189 is slidable on a guide rod or shaft 192 fixed in the framework so as to prevent rotation of carriage 189 and maintain same in its proper horizontal position. A transversely extending slot is formed in the lower portion of carriage 189 for receiving one or both of the cylindrical head portions of pins 187 and 188. This slot extends at right angles to the axis of shaft 7, and a hard metal wear plate 193 may be fixed in carriage 189 to form one side of this slot. A vertically movable hard metal plate 194 forms the other side of the slot. A tilting frame 195 is pivotally mounted on a transverse shaft 196 journaled in ears or brackets 197 formed on carriage 189. The frame 195 comprises a plurality of parallel arms 198 which support the transversely extending bar or wear plate 194. The bar 194 is beveled on its lower surface 199 for the reason hereinafter described. A plurality of springs 200 engage the upper surfaces of arms 198 to urge these arms downwardly until projections 201 at their free ends rest on a ledge 202 formed on carriage 189. In this position the bar or wear plate 194 will be in its normal position forming one wall of the transverse slot in carriage 189. A second transversely extending slot 203 is formed in the tilting plate 195, for a reason hereinafter explained. A pair of rigid arms 204 extend forwardly from carriage 189 at the two sides of operating shaft 7 and are secured to a collar 205 rotatably journaled on the shaft at a substantial distance from the carriage. This means serves to brace the carriage against both vertical and lateral tilting strains and thus prevent binding of the carriage upon the rotatable operating shaft. The upper ends of the springs 200 abut against ears 206 formed on the brackets 197 and arms 204 respectively.

In the operation of this shaft-reciprocating portion of the mechanism, the block or carriage 150 will be adjusted longitudinally of crank arm 149 in proportion to the diameter of the branch pipe B of the T, whereas the carriages 179 and 180 will be adjusted radially of the turn-table in accordance with the diameter of the main pipe or leader A. Suitable calibrations and indexes, not here shown, may be provided on the relatively movable parts for indicating the proper positions of adjustment of these parts. For cutting pipe sections for any reducing T, such as shown in Figs. 1, 2, 20 and 21, the carriage 50 will be positioned closer to the vertical axis of shaft 98 and turntable 168 than is the carriage 179, as shown for example in Fig. 3. One complete rotation of the crank arm and consequently of roller 153 will thus impart one complete cycle of reciprocations to slide 160, thus oscillating the carriage 179 twice in each direction through an arc of less than 180°. The pin 187 will remain continuously within the transverse slot in carriage 189 and two complete cycles of reciprocations, that is two reciprocations in each direction will be imparted to operating shaft 7 and the parts carried thereby. It will be noted that the reciprocating movements of shaft 7 are all according to simple harmonic motion, thus giving the proper rate of movement to the torches and giving the proper curvature to the cut surfaces.

In case two pipes of the same diameter are to be joined as shown in Figs. 22, 23 and 24, the carriages 150 and 179 will be adjusted to the same distance from the axis of shaft 98 and turn-table 168. In this case the amplitude of the reciprocating movements of slide 160 will be sufficient to oscillate the carriage 179 through a complete arc of 180°, and the operating parts would be liable to lock on dead center. In this special case the operation is changed by adjusting the screw 155 upwardly (see Fig. 7) so that locking pin 156 extends up into the tubular shaft 182 of roller 183 thus causing the carriages 150 and 179 to revolve as a unit about the axis of shaft 98. As the carriage 179 nears one of its extreme outer positions the pin 188 on the other carriage 180 will move under the bevel surface 199 of bar 194 thus elevating this bar as indicated in Fig. 7. This will release the pin 187 from the bar 194 and the carriage 189 will cease its movement toward the left in Fig. 7, and the pin 188 will now enter the slot and engage the plate 193 at the other side thereof to begin a reciprocation of the carriage 189 and operating shaft 7 in the opposite direction. It will thus be seen that the turn-table will rotate continuously in one direction but, as before, two complete reciprocations in each direction will be imparted to the operating shaft 7.

When pipe sections are to be cut for angle bends such as shown in Figs. 9, 10 and 11, a third method of adjustment is used. In this case the two carriages 150 and 179 are locked to rotate together as in Fig. 7, but the two operating pins 187 and 188 are temporarily removed from the carriages 179 and 180 and a longer pin 206 is substituted in the carriage 179, this pin extending upwardly through the slideway or slot 203 in the tilting plate 195. As a result, only one complete cycle of reciprocations (that is one complete reciprocation in each direction) will be imparted to the shaft 7 for each complete rotation of shaft 98, thus producing a continuous transverse cut of the type indicated in Fig. 9.

As is indicated in Fig. 1, the two feed conduits or pipes 207 and 208 leading from the source of supply of the torch-operating fluids (oxygen and acetylene) may be provided with branches 209 and 210 extending to each of the respective valve fittings 87 at the two ends of the machine for supplying these fluids to either or both of the cutting torches.

Briefly referring now to the general operation of the machine, it will first be assumed that pipe sections are to be cut for a reducing T connection such as indicated in Figs. 1 and 2. Certain preliminary adjustments must be made in accordance with the respective sizes of the pipe sections to be joined. The supporting yokes 21 must be adjusted to the proper height to support the two pipe sections in the horizontal plane of the axis of the operating shaft. The torches are each adjusted radially of the operating shaft in accordance with the diameters of the pipe sections, and the carriages or blocks 150, 179 and 180 are adjusted radially by means of the screws 157 and 184 in the manner already described. It will be noted that this preliminary adjustment of the carriages 179 and 180 toward or from the axis of operating shaft 198 and turn-table 168 will give an initial longitudinal adjustment to operating shaft 7 so as to properly position the left-hand torch mechanism in accordance with the diameter of the pipe section A. It will be apparent that the torch must move with a certain linear speed with respect to the pipe in order to allow the proper time for the cutting jet to burn the metal and make the cut. When cutting larger pipe sections, the speed of rotation of the operating shaft should be slower so as not to unduly increase the linear speed of the torch. Also when cutting thicker pipes, this linear speed should be somewhat reduced. These necessary speed changes are provided for by means of the change speed gear box 14. The cam mechanism is now adjusted in accordance with the bevel that is desired on the pipe surfaces. In cutting a reducing joint such as shown in Figs. 20 and 21, the cam 133 would be moved to operative position while cutting the opening in pipe A, and the cam mechanism would be moved to neutral position so as to make an unbeveled cut for cutting the branch pipe B. If the bevel on both pipe sections is to be the same, the cam mechanism may be left in the same adjustment while cutting both pipe sections. In fact, in this instance both pipe sections may be cut simultaneously if desired. As has already been pointed out, the lengths of the burner tips should also be preliminarily adjusted in accordance with the thickness of the pipe that is being cut.

All of these preliminary adjustments having been properly attended to, the machine may now be controlled by the operator while making the cut from a position adjacent the operating burner. The operator adjusts the valves 88 and 89 to control the cutting jet, and manipulates the reversing handle 91 (or 92) to stop, start and reverse the machine. The mechanism is entirely reversible, so that the operator may stop the machine and cause the cutting torch to retrace its path at any time.

When cutting pipes for a T joint when the pipes are of equal diameter (as in Figs. 22, 23 and 24) the preliminary adjustments will be much the same as noted above except in this case the carriages 150 and 179 are locked together by means of screw 155, and the other cam 134 will be used to control the bevel of the cut surfaces.

When cutting pipe sections for angle bends such as shown in Figs. 9, 10 and 11, the apparatus is adjusted by substituting the pin 206 for the operating pins 187 and 188 (see Fig. 8), and only the right-hand burner as shown in Figs. 1 and 2 is used. If a double bevel is to be imparted to the cut surface, the substitute burner tip shown in Fig. 26 is used. When making these cuts for angle bends, as well as when making any cuts of a constant bevel or of no bevel, the cam mechanism 133 and 134 should be placed in neutral position, and the burners should be locked in set position by placing a pin through the openings 80 and 81, as hereinabove described. Obviously there are numerous other methods by which the respective burners can be locked in any desired position, the one just mentioned being merely disclosed by way of example.

While it is quite possible in many instances to cut both pipes A and B simultaneously, it is usually more desirable to make each cut separately so that the operator can devote his entire attention to one of the cuts and stop, start or reverse the machine as may be necessary to control the torch most effectively. When the cut has been made in the main pipe or leader A, no further adjustments of the apparatus are necessary in order to cut the branch pipe B, except in some cases to adjust the cam mechanism for cutting a different bevel on pipe B.

It will now be apparent that according to this invention a complete machine is provided adapted to automatically cut pipe sections suitable for welding, either for making T joints or intersections or for making angle bends. A clean, smooth, properly beveled cut is made by a single operation, the cut surfaces being ready for welding and needing no further machining or preliminary preparations. The machine embodies a single, synchronized mechanism for rotating the shaft and imparting longitudinal reciprocations thereto with simple harmonic motion, and this mechanism is adjustable so as to impart either one or two complete cycles of reciprocation to the shaft for each rotation thereof. The same machine is capable of adjustment for cutting pipes of a wide variety of diameters and wall thicknesses, and the machine is entirely reversible and can be run equally well in either direction, and the burner is under the direct control of the operator from a location adjacent the burner so that both the intensity of the cutting jet and its direction of travel can be completely controlled at all times.

We claim:

1. In a pipe cutting apparatus, an operating shaft, a cutting torch carried by the shaft in offset relation thereto, and a means for rotating and simultaneously reciprocating the shaft, said means being adaptable for imparting either one or two complete cycles of reciprocations to the shaft for each rotation thereof.

2. In a pipe cutting apparatus, an operating shaft, a cutting torch carried by the shaft in offset relation thereto, and a reversible means for rotating and simultaneously reciprocating the shaft, said means being adaptable for imparting either one or two complete cycles of reciprocations to the shaft for each rotation thereof.

3. In a pipe cutting apparatus, an operating shaft, a cutting torch carried by the shaft in offset relation thereto, and a means for rotating and simultaneously reciprocating the shaft with simple harmonic motion, said means being adaptable for imparting either one or two complete cycles of reciprocations of variable amplitude to the shaft for each rotation thereof.

4. In a pipe cutting apparatus, a supporting frame, a main shaft journaled in the frame for both rotary movement and bodily reciprocating movements longitudinally of the axis of the shaft, a cutting torch mechanism carried in offset relation by one end portion of the shaft, means for rotating the shaft, and means for imparting reciprocations to the shaft at simple harmonic motion, said latter means including a bracket member movable longitudinally with the shaft, a member mounted to revolve in a plane parallel to the axis of the shaft, means for either rotating said revoluble member or oscillating same through an angle of less than 180°, and a plurality of adjustable pins carried by the revoluble member, one of the pins being adapted to continuously engage the bracket to reciprocate the shaft through two cycles while the shaft is rotated once and the revoluble member is oscillated, two of the pins being adapted to successively engage the bracket to reciprocate the shaft through two cycles while the shaft is rotated once and the revoluble member is rotated, and one of the pins being adapted to continuously engage the bracket to reciprocate the shaft through one cycle while the shaft is rotated once and the revoluble member is rotated.

5. In a pipe cutting apparatus, a supporting frame, a main shaft journaled in the frame for both rotary movement and bodily reciprocating movements longitudinally of the axis of the shaft, a cutting torch mechanism carried in offset relation by one end portion of the shaft, means for rotating the shaft, and means for imparting reciprocations to the shaft at simple harmonic motion, said latter means including a bracket member movable longitudinally with the shaft, a turntable journaled at its periphery to rotate in a plane parallel to the axis of the shaft, means for either rotating the turntable or oscillating same through an angle of less than 180°, and means on the turntable engaging the bracket member to positively reciprocate the shaft in both directions.

6. In a pipe cutting apparatus, a supporting frame, a main shaft journaled in the frame for both rotary movement and bodily reciprocating movements longitudinally of the axis of the shaft, a cutting torch mechanism carried in offset relation by one end portion of the shaft, means for rotating the shaft, and means for imparting reciprocations to the shaft at simple harmonic motion, said latter means including a bracket member movable longitudinally with the shaft, a turntable journaled at its periphery to rotate in a plane parallel to the axis of the shaft, means for either rotating the turntable or oscillating same through an angle of less than 180°, and adjustable means on the turntable to engage the bracket member and positively move the shaft in both directions with reciprocations of adjustable amplitude.

7. In a pipe cutting apparatus, means for supporting a pipe section, a cutting torch, a rotary shaft, means for supporting the torch in offset relation from one end portion of the shaft, means for rotating the shaft, and means for simultaneously imparting longitudinal movements to the shaft so that the torch will follow a closed path to produce an endless cut in the pipe section, said last mentioned means comprising a non-rotary bracket member connected with the shaft to move longitudinally therewith and formed with a slot extending at right angles to the path of movement of the member, a member revoluble in a plane substantially parallel to the axis of the shaft, a pin on the member engaging in the slot, and means for oscillating the member.

8. In a pipe cutting apparatus, means for supporting a pipe section, a cutting torch, a rotary shaft, means for supporting the torch in offset relation from one end portion of the shaft, means for rotating the shaft, and means for simultaneously imparting longitudinal movements to the shaft so that the torch will follow a closed path to produce an endless cut in the pipe section, said last mentioned means comprising a non-rotary bracket member connected with the shaft to move longitudinally therewith and formed with a slot extending at right angles to the path of movement of the member, a member revoluble in a plane substantially parallel to the axis of the shaft, a pin on the member engaging in the slot, means for adjusting the pin toward or from the pivotal axis of the member, and means for oscillating the member.

9. In a pipe cutting apparatus, means for supporting a pipe section, a cutting torch, a rotary shaft, means for supporting the torch in offset relation from one end portion of the shaft, means for rotating the shaft, and means for simultaneously imparting longitudinal movements to the shaft so that the torch will follow a closed path to produce an endless cut in the pipe section, said last mentioned means comprising a non-rotary bracket member connected with the shaft to move longitudinally therewith and formed with a slot extending at right angles to the path of movement of the member, a member revoluble in a plane substantially parallel to the axis of the shaft, one wall of the slot being yieldably movable in a direction away from the member, the outer surface of the movable wall being beveled, a pair of pins carried by the member at diametrically opposite sides of the pivotal axis thereof, the pins being alternatively engageable in the slot, and one of the pins being adapted to engage the beveled surface and shift the movable wall whereby this pin enters the slot and permits the other pin to pass out of the slot, and means for rotating the member.

10. In a pipe cutting apparatus, means for supporting a pipe section, a cutting torch, a rotary shaft, means for supporting the torch in offset relation from one end portion of the shaft, means for rotating the shaft, and means for simultaneously imparting longitudinal movements to the shaft so that the torch will follow a closed path to produce an endless cut in the pipe section, said last mentioned means comprising a non-rotary bracket member connected with the shaft to move longitudinally therewith and formed with a slot extending at right angles to the path of movement of the member, a member revoluble in a plane substantially parallel to the axis of the shaft, one wall of the slot being yieldably movable in a direction away from the member, the outer surface of the movable wall being beveled, a pair of pins carried by the member at diametrically opposite sides of the pivotal axis thereof, means for simultaneously and equally adjusting the pins toward or from the axis of the member, the pins being alternatively engageable in the slot, and one of the pins being adapted to engage the beveled surface and shift the movable wall whereby this pin enters the slot and permits the other pin to pass out of the slot, and means for rotating the member.

11. In a pipe cutting apparatus, means for supporting a pipe section, a cutting torch, a rotary shaft, means for supporting the torch in offset relation from one end portion of the shaft, means for rotating the shaft, and means for simultaneously imparting longitudinal movements to the shaft so that the torch will follow a closed path to produce an endless cut in the pipe section, said last mentioned means comprising a non-rotary bracket member connected with the shaft to move longitudinally therewith and formed with a slot extending at right angles to the path of movement of the member, a member revoluble in a plane substantially parallel to the axis of the shaft, a pin on the member engaging in the slot, a slide member reciprocable transversely of the axis of the shaft, and formed with slots extending parallel to the shaft, a pin on the revoluble member engaging in one of the slots in the slide, an operating shaft rotatable about the same pivotal axis as the revoluble member in synchronous relation to the main shaft, a crank arm on the operating shaft, a pin carried by the crank arm and engaging in a slot of the slide member, and means for adjusting the last mentioned pin toward or from the axis of the operating shaft.

12. In a pipe cutting apparatus, means for supporting a pipe section, a cutting torch, a rotary shaft, means for supporting the torch in offset relation from one end portion of the shaft, means for rotating the shaft, and means for simultaneously imparting longitudinal movements to the shaft so that the torch will follow a closed path to produce an endless cut in the pipe section, said last mentioned means comprising a non-rotary bracket member connected with the shaft to move longitudinally therewith and formed with a slot extending at right angles to the path of movement of the member, a member revoluble in a plane substantially parallel to the axis of the shaft, one wall of the slot being yieldably movable in a direction away from the member, the outer surface of the movable wall being beveled, a pair of pins carried by the member at diametrically opposite sides of the pivotal axis thereof, the pins being alternatively engageable in the slot, and one of the pins being adapted to engage in the beveled surface and shift the movable wall whereby this pin enters the slot and permits the other pin to pass out of the slot, a slide member reciprocable transversely of the axis of the shaft, and formed with slots extending parallel to the shaft, a pin on the revoluble member engaging in one of the slots in the slide, an operating shaft rotatable about the same pivotal axis as the revoluble member in synchronous relation to the main shaft, a crank arm on the operating shaft, a pin carried by the crank arm and engaging in a slot of the slide member, and means for adjusting the last mentioned pin toward or from the axis of the operating shaft.

13. In a pipe cutting apparatus, means for supporting a pipe section, a cutting torch, a rotary shaft, means for supporting the torch in offset relation from one end portion of the shaft, means for rotating the shaft, and means for simultaneously imparting longitudinal movements to the shaft so that the torch will follow a closed path to produce an endless cut in the pipe section, said last mentioned means comprising a non-rotary bracket member connected with the shaft to move longitudinally therewith and formed with a slot extending at right angles to the path of movement of the member, a member revoluble in a plane substantially parallel to the axis of the shaft, one wall of the slot being yieldably movable in a direction away from the member, the outer surface of the movable wall being beveled, a pair of pins carried by the member at diametrically opposite sides of the pivotal axis thereof, the pins being alternatively engageable in the slot, and one of the pins being adapted to engage the beveled surface and shift the movable wall whereby this pin enters the slot and permits the other pin to pass out of the slot, a slide member reciprocable transversely of the axis of the shaft, and formed with slots extending parallel to the shaft, a pin on the revoluble member engaging in one of the slots in the slide, an operating shaft rotatable about the same pivotal axis as the revoluble member in synchronous relation to the main shaft, a crank arm on the operating shaft, a pin carried by the crank arm and engaging in a slot of the slide member, means for adjusting the last mentioned pin toward or from the axis of the operating shaft and means for securing together the two pins which engage the slotted slide to revolve in unison at such times as these pins are adjusted at equal distances from the axis of the operating shaft and revoluble member.

14. In a pipe cutting apparatus, a cutting torch, means for supporting and moving the torch at a predetermined linear speed through an orbit positioned about a predetermined closed path described on the inner surface of the pipe, and means for varying the inclination of the torch with respect to the inner surface of the pipe while maintaining the cutting jet constantly directed toward points on the path.

15. In a pipe cutting apparatus, a cutting torch, means for supporting and moving the torch at a predetermined linear speed through an orbit positioned about a predetermined closed path described on the inner surface of the pipe, means for varying the inclination of the torch while maintaining the cutting jet constantly directed toward points on the path, and means for varying the effective position of the torch toward or from the path for cutting pipes of different wall thicknesses.

16. In a pipe cutting apparatus, a fixed supporting frame, an operating shaft mounted in the frame for both rotary and longitudinal movements, means for supporting a pipe section with its longitudinal axis in the plane of the axis of the shaft, a cutting torch, means for supporting the torch in offset relation at one end of the shaft so that the cutting jet from the torch will be directed toward and will follow a predetermined closed path described on the inner surface of the pipe section, said torch supporting means including means for varying the inclination of the torch as it is revolved to vary the bevel of the cut surface in the pipe section without changing the size of the opening cut in the pipe.

17. In a pipe cutting apparatus, a fixed supporting frame, an operating shaft mounted in the frame for both rotary and longitudinal movements, means for supporting a pipe section with its longitudinal axis in the plane of the axis of the shaft, a cutting torch, means for supporting the torch in offset relation at one end of the shaft so that the cutting jet from the torch will be directed toward and will follow a predetermined closed path described on the inner surface of the pipe section, said torch supporting means including means for varying the inclination of the torch as it is revolved to vary the bevel of the cut surface in the pipe section without changing the size of the opening cut in the pipe, and a plurality of torch tips of different lengths adapted for interchangeable use in the torch so that a constant distance of the torch tip from the outer surface of the pipe section may be obtained with pipe sections of different thicknesses.

18. In a pipe cutting apparatus, a fixed supporting frame, an operating shaft mounted in the frame for both rotary and longitudinal movements, means for supporting a pipe section with its longitudinal axis in the plane of the axis of the shaft, a cutting torch, means for supporting the torch in offset relation at one end of the shaft so that the cutting jet from the torch will be directed toward and will follow a predetermined closed path described on the inner surface of the pipe section, said torch supporting means including means for varying the inclination of the torch as it is revolved to vary the bevel of the cut surface in the pipe section without changing the size of the opening cut in the pipe, means for locking the torch supporting means in different positions of adjustment whereby an unbeveled cut or cuts of fixed bevels may be made, and a double torch tip adapted to be alternatively used with the torch when the torch is locked for an unbeveled cut whereby both sides of the cut surface are simultaneously beveled.

19. In a pipe cutting apparatus, a fixed supporting frame, an operating shaft mounted in the frame for both rotary and longitudinal movements, means for supporting a pipe section with its longitudinal axis in the plane of the axis of the shaft, a cutting torch, means for supporting the torch in offset relation at one end of the shaft so that the cutting jet from the torch will be directed toward and will follow a predetermined closed path described on the inner surface of the pipe section, said torch supporting means including means for varying the inclination of the torch as it is revolved to vary the bevel of the cut surface in the pipe section without changing the size of the opening cut in the pipe, and means for adjusting the effective position of the torch with relation to the outer surface of the pipe.

20. In pipe cutting apparatus, an operating shaft, means for rotating the shaft and imparting longitudinal movements thereto, means for supporting a pipe section with its longitudinal axis in the plane of the operating shaft, an offset bracket carried by one end of the shaft, a cutting torch carried by the bracket, and means for varying the inclination of the torch with respect to the pipe surface as the torch is revolved around the axis of the shaft, said means including a fixed cam and means carried by the shaft and engaging the cam.

21. In pipe cutting apparatus, an operating shaft, means for rotating the shaft and imparting longitudinal movements thereto, means for supporting a pipe section with its longitudinal axis in the plane of the operating shaft, an offset bracket carried by one end of the shaft, a cutting torch carried by the bracket, and means for varying the inclination of the torch with respect to the inner surface of the pipe as the torch is revolved around the axis of the shaft.

22. In pipe cutting apparatus, an operating shaft, means for rotating the shaft and imparting longitudinal movements thereto, means for supporting a pipe section with its longitudinal axis in the plane of the operating shaft, an offset bracket carried by one end of the shaft, a cutting torch carried by the bracket, and means for varying the inclination of the torch with respect to the inner surface of the pipe as the torch is revolved around the axis of the shaft, said means including a fixed cam and means carried by the shaft and engaging the cam.

23. In pipe cutting apparatus, an operating shaft, means for rotating the shaft and imparting longitudinal movements thereto, means for supporting a pipe section with its longitudinal axis in the plane of the operating shaft, an offset bracket carried by one end of the shaft, a cutting torch, a lever fulcrumed on the bracket, parallel links connecting the torch and lever, and means for swinging the lever about its fulcrum as the shaft is rotated to carry the inclination of the torch with respect to a surface of the pipe.

24. In pipe cutting apparatus, an operating shaft, means for rotating the shaft and imparting longitudinal movements thereto, means for supporting a pipe section with its longitudinal axis in the plane of the operating shaft, an offset bracket carried by one end of the shaft, a cutting torch, a lever fulcrumed on the bracket, parallel links connecting the torch and lever, an inner shaft pivoted coaxially within the operating shaft, a gear sector on the lever, gearing connections between the sector and inner shaft, and means for imparting a variable rotary movement to the inner shaft as the operating shaft is rotated to vary the inclination of the torch with respect to a surface of the pipe.

25. In pipe cutting apparatus, an operating shaft, means for rotating the shaft and imparting longitudinal movements thereto, means for supporting a pipe section with its longitudinal axis in the plane of the operating shaft, an offset bracket carried by one end of the shaft, a cutting torch, a lever fulcrumed on the bracket, parallel links connecting the torch and lever, an inner shaft pivoted coaxially within the operating shaft, a gear sector on the lever, gearing connections between the sector and inner shaft, a fixed cam, and means engaging said cam for imparting a variable rotary movement to the inner shaft as the operating shaft is rotated to vary the inclination of the torch with respect to a surface of the pipe.

26. In pipe cutting apparatus, an operating shaft, means for rotating the shaft and imparting longitudinal movements thereto, means for supporting a pipe section with its longitudinal axis in the plane of the operating shaft, an offset bracket carried by one end of the shaft, a cutting torch, a lever fulcrumed on the bracket, parallel links connecting the torch and lever, and means for locking the lever in different selected positions of inclination on the bracket.

27. In pipe cutting apparatus, an operating shaft, means for rotating the shaft and imparting longitudinal movements thereto, means for supporting a pipe section with its longitudinal axis in the plane of the operating shaft, a radially projecting bracket carried by one end of the shaft, a supporting frame adjustable radially on said bracket, a lever fulcrumed on the plate, a cutting torch, parallel links connecting the torch and lever, a rotary counter-shaft mounted in the supporting frame and extending radially of the operating shaft at both sides of the axis thereof, a gear sector on the lever, a gear on the counter-shaft engaging the gear sector, an inner shaft pivoted coaxially within the operating shaft, intermeshing bevel gears one of which is fixed on the end of the inner shaft and the other of which is slidably keyed on the counter-shaft, and means for imparting a variable rotary movement to the inner shaft as the operating shaft is rotated to vary the inclination of the torch with respect to a surface of the pipe.

28. In pipe cutting apparatus, an operating shaft, means for rotating the shaft and imparting longitudinal movements thereto, means for supporting a pipe section with its longitudinal axis in the plane of the operating shaft, a radially projecting bracket carried by one end of the shaft, a supporting frame adjustable radially on said bracket, a lever fulcrumed on the plate, a cutting torch, parallel links connecting the torch and lever, a rotary counter-shaft mounted in the supporting frame and extending radially of the operating shaft at both sides of the axis thereof, a gear sector on the lever, a gear on the counter-shaft engaging the gear sector, an inner shaft pivoted coaxially within the operating shaft, intermeshing bevel gears one of which is fixed on the end of the inner shaft and the other of which is slidably keyed on the counter-shaft, a fixed cam, and means engaging said cam for imparting a variable rotary movement to the inner shaft as the operating shaft is rotated.

29. In pipe cutting apparatus, an operating shaft, means for rotating the shaft and imparting longitudinal movements thereto, means for supporting a pipe section with its longitudinal axis in the plane of the operating shaft, a radially projecting bracket carried by one end of the shaft, a supporting frame adjustable radially on said bracket, a lever fulcrumed on the plate, a cutting torch, parallel links connecting the torch and lever, a rotary counter-shaft mounted in the supporting frame and extending radially of the operating shaft at both sides of the axis thereof, a gear sector on the lever, a gear on the counter-shaft engaging the gear sector, an inner shaft pivoted coaxially within the operating shaft, intermeshing bevel gears one of which is fixed on the end of the inner shaft and the other of which is slidably keyed on the counter-shaft, a fixed cam, a frame keyed to the operating shaft to rotate therewith while permitting the shaft to move axially therethrough, a roller engaging the cam, an arm carrying the roller and slidable in the last mentioned frame, and rack and gear connections between the arm and the inner shaft.

30. In pipe cutting apparatus, an operating shaft, means for rotating the shaft and imparting longitudinal movements thereto, means for supporting a pipe section with its longitudinal axis in the plane of the operating shaft, a radially projecting bracket carried by one end of the shaft, a supporting frame adjustable radially on said bracket, a lever fulcrumed on the plate, a cutting torch, parallel links connecting the torch and lever, a rotary counter-shaft mounted in the supporting frame and extending radially of the operating shaft at both sides of the axis thereof, a lever on the lever, a gear on the counter-shaft engaging the gear sector, an inner shaft pivoted coaxially within the operating shaft, intermeshing bevel gears one of which is fixed on the end of the inner shaft and the other of which is slidably keyed on the counter-shaft, a fixed cam, a frame keyed to the operating shaft to rotate therewith while permitting the shaft to move axially therethrough, a pair of arms mounted in this frame one at either side of the shaft and slidable in the frame, a roller mounted at one end of each arm, the rollers being adapted to alternatively engage the cam as the operating shaft is rotated to shift the arms transversely of the shaft, and rack and gear connections between the arms and the inner shaft.

31. In a pipe cutting apparatus, a fixed supporting frame, an operating shaft mounted in said frame for both rotary and longitudinal movements, a cutting torch carried in offset relation at one end of the shaft, an inner shaft journaled coaxially within the operating shaft, operating connections between the inner shaft and torch for varying the inclination of the torch with respect to the axis of the shaft as the inner shaft is rotated with relation to the operating shaft, a rotary frame held from longitudinal movement, said operating shaft being keyed within said rotary frame to rotate therewith but be longitudinally movable therethrough, means for rotating the rotary frame, means for reciprocating the operating shaft, a fixed cam, and means carried by the rotary frame and engaging the cam for imparting variable rotary movements to the inner shaft as the operating shaft is rotated.

32. In a pipe cutting apparatus, a fixed supporting frame, an operating shaft mounted in said frame for both rotary and longitudinal movements, a cutting torch carried in offset relation at one end of the shaft, an inner shaft journaled coaxially within the operating shaft, operating connections between the inner shaft and torch for varying the inclination of the torch with respect to the axis of the shaft as the inner shaft is rotated with relation to the operating shaft, a rotary frame held from longitudinal movement, said operating shaft being keyed within said rotary frame to rotate therewith but be longitudinally movable therethrough, means for rotating the rotary frame, means for reciprocating the operating shaft, a pair of normally stationary cams of differing contours, means carried by the rotary frame for engaging one of the cams for imparting variable rotary movements to the inner shaft as the operating shaft is rotated, and means for shifting the cams from a neutral position in which neither cam engages the last mentioned means to positions in which either of the cams may be alternatively operatively engaged with this means.

33. In a pipe cutting apparatus, a fixed supporting frame, an operating shaft mounted in said frame for both rotary and longitudinal movements, a cutting torch carried in offset relation at one end of the shaft, an inner shaft journaled coaxially within the operating shaft, operating connections between the inner shaft and torch for varying the inclination of the torch with respect to the axis of the shaft as the inner shaft is rotated with relation to the operating shaft, a rotary frame held from longitudinal movement, said operating shaft being keyed within said rotary frame to rotate therewith but be longitudinally movable therethrough, means for rotating the rotary frame, means for reciprocating the operating shaft, a fixed cam, an arm slidable in the rotary frame transversely of the operating shaft, a roller carried by the arm and engaging the cam, and rack and gear connections between the arm and inner shaft.

34. In a pipe cutting apparatus, a fixed supporting frame, an operating shaft mounted in said frame for both rotary and longitudinal movements, a cutting torch carried in offset relation at one end of the shaft, an inner shaft journaled coaxially within the operating shaft, operating connections between the inner shaft and torch for varying the inclination of the torch with respect to the axis of the shaft as the inner shaft is rotated with relation to the operating shaft, a rotary frame held from longitudinal movement, said operating shaft being keyed within said rotary frame to rotate therewith but be longitudinally movable therethrough, means for rotating the rotary frame, means for reciprocating the operating shaft, a fixed cam, a pair of arms slidable in the rotary frame transversely of the operating shaft, a roller carried at one end of one arm and a roller carried at the opposite end of the other arm so that the rollers are positioned at diametrically opposite sides of the shaft and will successively engage the cam as the shaft is rotated, and rack and gear connections between the arms and the inner shaft, whereby a reciprocating movement of either arm will impart an equal and opposite movement to the other arm and will also rotate the inner shaft relatively to the operating shaft.

35. In a pipe cutting apparatus, a fixed supporting frame, an operating shaft mounted in said frame for both rotary and longitudinal movements, a cutting torch carried in offset relation at one end of the shaft, an inner shaft journaled coaxially within the operating shaft, operating connections between the inner shaft and torch for varying the inclination of the torch with respect to the axis of the shaft as the inner shaft is rotated with relation to the operating shaft, a rotary frame held from longitudinal movement, said operating shaft being keyed within said rotary frame to rotate therewith, but be longitudinally movable therethrough, means for rotating the rotary frame, means for reciprocating the operating shaft, a pair of normally stationary cams of differing contours, a pair of arms slidable in the rotary frame transversely of the operating shaft, rollers carried at one end of one arm and at the opposite end of the other arm so that the rollers are positioned at diametrically opposite sides of the shaft and will successively engage one of the cams as the operating shaft is rotated, rack and gear connections between the arms and the inner shaft whereby a reciprocating movement of either arm will impart an equal and opposite movement to the other arm and will also rotate the inner shaft relatively to the operating shaft, and means for shifting the cams from a neutral position in which neither cam engages the rollers to positions in which either of the cams may be alternatively operatively engaged with the rollers.

36. In a pipe cutting apparatus, a supporting frame, an operating shaft journaled in the frame for both rotary and longitudinal movements, means for supporting a pipe section beyond one end of the shaft with its longitudinal axis in the plane of the axis of the shaft, a cutting torch, means for supporting the torch in offset relation at the end of the shaft, means for simultaneously imparting rotary and reciprocating movements to the shaft so that the cutting jet from the torch will follow a predetermined closed path on a surface of the pipe, means extending to an accessible position adjacent the end of the apparatus where the torch is positioned for reversing the direction of movement of the means for moving the shaft, control valves positioned on the supporting frame adjacent this end of the apparatus, conduits leading to these valves from a source of supply of combustion fluids, and flexible conduits leading from the valves to the torch.

37. In a pipe cutting apparatus, a supporting frame, an operating shaft journaled in the frame for both rotary and longitudinal movements, means adjacent each end of the shaft for supporting a pipe section, one pipe section being positioned with its longitudinal axis in prolongation of the axis of the shaft, the other pipe section being positioned with its axis in the plane of the axis of the shaft but at right angles thereto, a pair of cutting torches, means adjacent each end of the shaft for supporting one of the torches in offset relation to the shaft, means for simultaneously imparting rotary and reciprocating movements to the shaft so that the cutting jets from the torches will follow similar predetermined closed paths on the pipe surfaces, means for reversing the last-mentioned means, said reversing means having operating handles extending to accessible positions adjacent each end of the apparatus, control valves for each torch positioned on the supporting frame adjacent the position of the torch, connections from the valves to a source of supply of combustible fluids, and flexible conduits leading from each torch to its respective valves.

38. In a pipe cutting apparatus, a supporting frame, an operating shaft journaled in the frame for both rotary and longitudinal movements, means for supporting a pipe section beyond one end of the shaft with its longitudinal axis in the plane of the axis of the shaft, a cutting torch, means for supporting the torch in offset relation at the end of the shaft, means for simultaneously imparting rotary and reciprocating movements to the shaft so that the cutting jet from the torch will follow a predetermined closed path on a surface of the pipe, a reversible motor for driving the last-mentioned means, a reversing switch for the motor, operating handles for the switch positioned adjacent the respective ends of the apparatus, control valves positioned on the supporting frame adjacent this end of the apparatus, conduits leading to these valves from a source of supply of combustion fluids, and flexible conduits leading from the valves to the torch.

39. In a pipe cutting apparatus, a supporting frame, an operating shaft journaled in the frame for both rotary and longitudinal movements, means adjacent each end of the shaft for supporting a pipe section, one pipe section being positioned with its longitudinal axis in prolongation of the axis of the shaft, the other pipe section being positioned with its axis in the plane of the axis of the shaft but at right angles thereto, a pair of cutting torches, means adjacent each end of the shaft for supporting one of the torches in offset relation to the shaft, means for simultaneously imparting rotary and reciprocating movements to the shaft so that the cutting jets from the torches will follow similar predetermined closed paths on the pipe surfaces, a reversible motor for driving the last-mentioned means, a reversing switch for the motor, operating handles for the switch positioned adjacent the respective ends of the apparatus, said reversing means having operating handles extending to accessible positions adjacent each end of the apparatus, control valves for each torch positioned on the supporting frame adjacent the position of the torch, connections from the valves to a source of supply of combustible fluids, and flexible conduits leading from each torch to its respective valves.

FRANK J. DOUGLASS.
ALBERT S. McCAWLEY.